Nov. 21, 1967  D. A. J. DAVIS  3,354,417
COIL BOBBIN HAVING PROJECTIONS EXTENDING BEYOND MAGNETIC CORE
Filed Feb. 17, 1966  2 Sheets-Sheet 1

INVENTOR
Dhu Aine J. Davis
BY
Hofgren, Wegner, Allen, Stellman & McCord
ATTORNEY

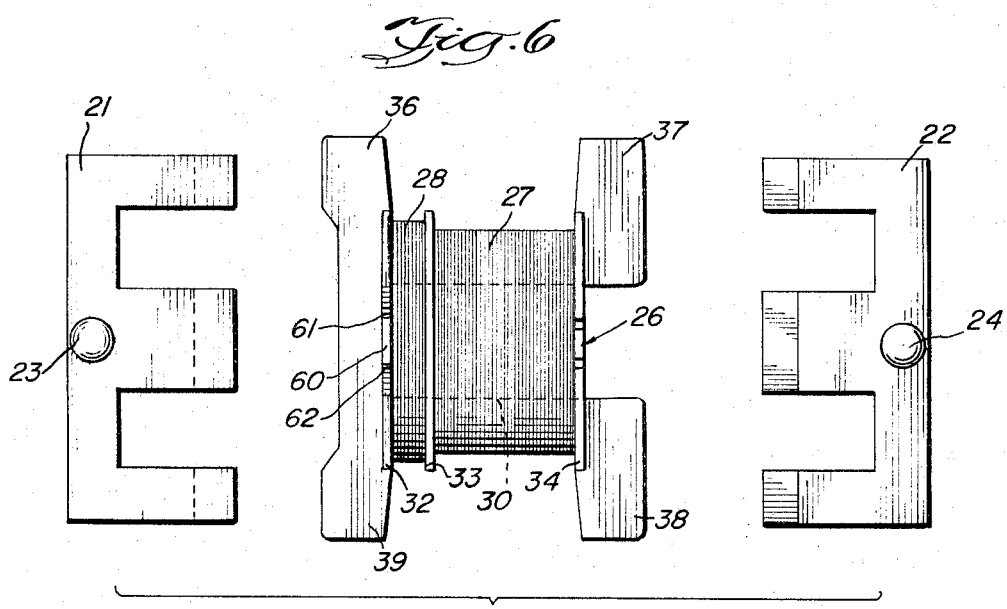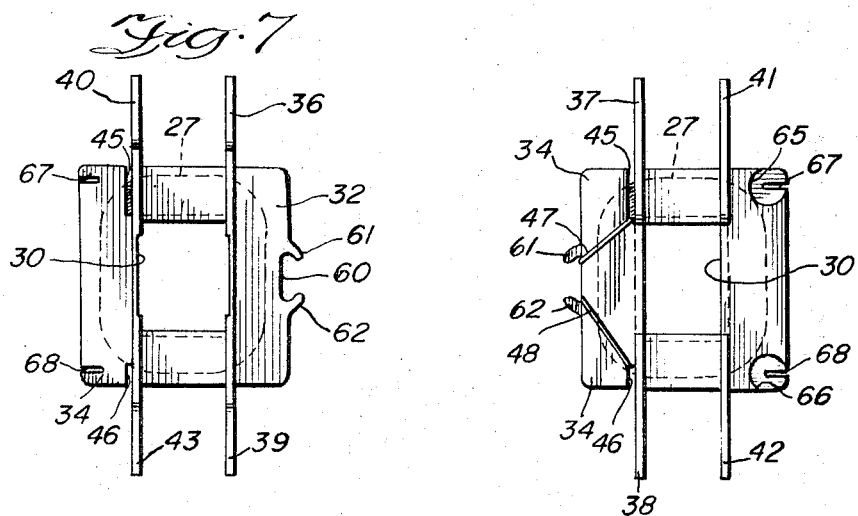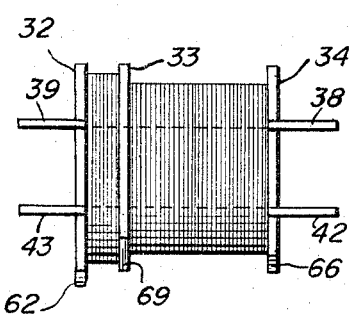

United States Patent Office 3,354,417
Patented Nov. 21, 1967

3,354,417
COIL BOBBIN HAVING PROJECTIONS EXTENDING BEYOND MAGNETIC CORE
Dhu Aine J. Davis, Wheaton, Ill., assignor to Hermetic Coil Co., Inc., a corporation of Connecticut
Filed Feb. 17, 1966, Ser. No. 528,167
3 Claims. (Cl. 336—198)

ABSTRACT OF THE DISCLOSURE

A transformer encapsulated with injection molded plastic has a subassembly which facilitates the molding operation. The transformer coils are wound on a bobbin fitted on the center leg of an E core. The bobbin, also of thermoplastic material, has flaps which extend outwardly overlying the faces of the transformer core and extending beyond the core edges to position the subassembly in a mold with the core surfaces spaced from the mold so that the encapsulating material may flow freely around the transformer.

Specification

This invention relates to an electrical inductor and more particularly to a novel bobbin construction and a core and bobbin subassembly particularly adapted for construction of an inductor which is encapsulated or encased in a sealed sheath, as of a thermoplastic material.

The bobbin on which the winding is wound and the subassembly are particularly adapted for encapsulation with a thermoplastic material, as by an injection molding operation. In many respects injection molding is a particularly desirable method for encapsulating articles, as transformers. The plastic materials which may be used, as polyethylene or Nylon or the like, are well suited for use in the electrical equipment throughout a wide variety of conditions. Such materials have dielectric strength required to withstand high electrical voltages and are not subject to deterioration at high and low temperatures.

One problem with injection molding of an encapsulating body around an electrical device is that of positioning the device in the mold. This positioning must be accomplished quickly and without requiring use of skilled labor, which would increase the manufacturing cost and offset the advantages derived from the rapidity with which the injection molding operation may be carried out.

A principal object of this invention is the provision of a novel bobbin and a bobbin and transformer core subassembly in which the bobbin having coils wound thereon has flaps extending outwardly therefrom. More specifically, the bobbin has a bore which receives a leg of a core and the flaps extend from the bobbin overlying the face of the core and extending beyond the periphery thereof to engage the walls of a mold positioning the assembly in the mold for the injection of the plastic material. Preferably, the bobbin is of a material which is compatible with the encapsulating material and which will form a continuous body therewith.

Further features and advantages of the invention will readily be apparent from the following specification and from the drawings, in which:

FIGURE 6 is an enlarged exploded view of the bobbin, and coil and the transformer core;

FIGURE 7 is an end view looking from the left of FIGURE 6;

FIGURE 8 is an end view looking from the right of FIGURE 6; and

FIGURE 9 is an end view looking from the bottom of FIGURE 6.

The invention is illustrated herein as embodied in a two-winding transformer having a laminated iron core. It may be utilized in other types of inductor devices where it is desired to encapsulate a coil, bobbin and core.

Figure 1:
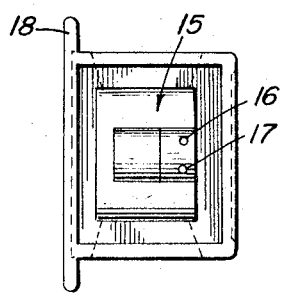
FIGURE 1 is an elevation view of an encapsulated transformer embodying the invention.

Turning now to the drawings and particularly to FIGURE 1, a completed transformer is shown encased in a covering 15 of molded thermoplastic material. Terminals 16 and 17 extend outwardly through the plastic casing for connection of the transformer with a circuit. Similar terminals extend outwardly from the transformer on the reverse side. A flange 18 formed along one edge of the transformer provides a means for mounting the transformer.

The transformer disclosed herein is a step-down transformer from 110 volts primary to 1½ volt secondary, and may be used with a suitable rectifier to charge a battery. The transformer, and if desired the associated rectifiers, are completely encased in thermoplastic material which forms a waterproof housing that is also resistant to physical damage.

Turning now to FIGURES 6 through 9, the bobbin, windings and core are shown in more detail. The iron core, FIGURE 6, has a double E configuration with each of the core portions 21 and 22 made up of a plurality of laminations held together as by rivets 23 and 24. The ends of the legs of the E core portions are interleaved for reduction of the air gap reluctance. Bobbin 26 on which windings 27 and 28 are wound has a tubular element 30 which has a rectangular cross-section, FIGURE 8, to receive the center leg of the core. Extending outwardly from the tubular element of the bobbin are three parallel flanges 32, 33 and 34 which lie in planes at right angles to the axis of the bobbin and define the ends of the primary and secondary windings 27 and 28. The outermost flanges 32 and 34 are located at the ends of the tubular element.

The double E core when assembled with the bobbin has its center leg extending through the axial bore of the bobbin with its outer legs extending along the windings on either side thereof. The bobbin has extending from either end thereof a plurality of flaps 36 through 43 which overlie each corner of the faces of the core.

A portion of end flange 34 is spaced from adjacent flaps 37 and 38 and from the central portion of the flange by slots 45 and 46 which extend inwardly adjacent to and parallel with the flaps. The ends of primary winding 27, wires 47 and 48 representing the start and end of the winding, are brought out through the slots and over the outer surface of flange 34 for connection with the ends of terminal leads 50 and 51, FIGURE 2. Slot 45 extends inwardly from the edge of the flange to the tubular bobbin element 30 while slot 46 extends inwardly only to the outer surface of winding 27. Similar slots 53 and 54 are provided in flange 32, FIGURE 4, for the ends of the secondary winding, which are connected with secondary terminal leads 55 and 56.

Figure 4:
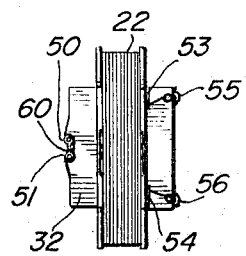
FIGURE 4 is an elevation view looking from the left of FIGURE 3.
Figure 5:
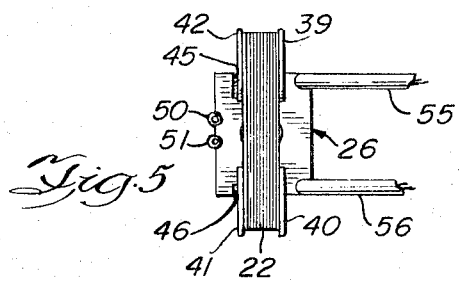
FIGURE 5 is a view looking from the rear of FIGURE 4.

The outer flanges 32 and 34 are provided with terminal receiving means to hold the terminals during assembly and molding of the transformer. As best seen in FIGURES 4 and 6, the flange 32 has centrally located therein a recess 60 with lips 61 and 62 which overlie a portion of the recess to retain terminal leads 50, 51, which may be a length of two-conductor molded cord.

The secondary terminal leads 55 and 56 are located at the outer corners of the bobbin structure and flange 34 has formed in two corners thereof generally circular recesses 65 and 66, each greater than a hemisphere in extent and in which the terminal leads are held. Opposite end flange 32 has a pair of slots 67 and 68, aligned with recesses 65 and 66, to receive the conductor at the end of terminal leads 55 and 56.

The intermediate flange 33 is recessed, as at 69, to receive, but not to hold, the secondary terminals.

Figure 2:
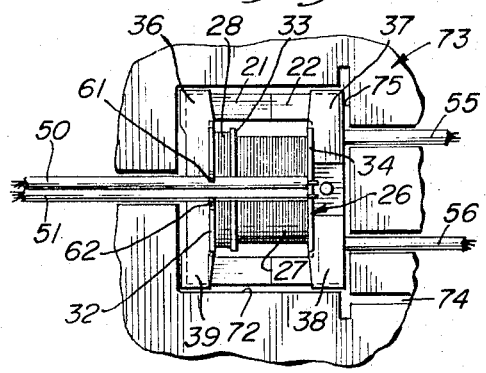
FIGURE 2 is an elevation view of an assembled transformed in a mold, prior to encapsulation.
Figure 3:
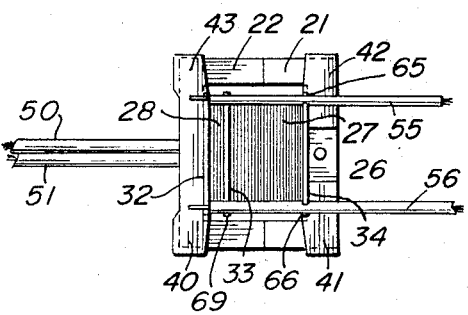
FIG. 3 is an elevation view of the assembled transformer looking from the rear of FIGURE 2.

The flaps 36 through 43 on the bobbin serve to position the bobbin, winding and core subassembly in a mold for encapsulation by an injection molding operation with a thermoplastic material. This is illustrated in FIGURE 2 where the transformer subassembly is shown positioned in the cavity 72 of one-half 73 of a mold. The outer periphery of the flaps extend beyond the edges of core portions 21 and 22 along the three edges of the core. The flaps engage the wall of the mold cavity and space the core therefrom. The terminals 50, 51 and 55, 56 extend outwardly from the mold through channels. The mold is closed, as by a complementary mold part (not shown) and liquid encapsulating material is introduced through a passage 74. Channel 75 in the mold provides for the formation of base flange 18. The outer edges of the flaps locate the subassembly within the mold spacing the core from the mold wall to permit free flow of encapsulation material. Furthermore, the mold members themselves engage the faces of the flaps, positioning the subassembly in a direction at right angles to the plane viewed in FIGURE 2. The relationship of the flaps of the bobbin to the completed transformer may be seen in FIGURE 1 where the outline of the flaps is shown in broken lines.

Preferably, the bobbin is molded of a thermoplastic material which is compatible with or the same as the encapsulating material. Nylon is particularly suitable in many cases. If the molding conditions, as the temperature of the mold and the temperature of the liquid encapsulating material, are properly controlled, the exposed surfaces of the bobbin are softened during the encapsulating operation and merge or amalgamate with the encapsulating material.

While I have shown and described certain embodiments of my invention, it is to be understood it is capable of many modifications. Changes, therefore, in the construction and arrangement may be made without departing from the spirit and scope of the invention as disclosed in the appended claims.

I claim:

1. A subassembly for an encapsulated inductor comprising: a tubular bobbin element having an axial bore; windings thereon; a core of generally rectangular cross section having a leg extending through the axial bore of the bobbin bore and extending outwardly beyond the said bobbin; and flaps on the bobbin in planes parallel with said bore axis, overlying the face of the core outside the bobbin more and extending outwardly beyond the periphery of said core to position the subassembly in a mold.

2. The subassembly for an encapsulated inductor of claim 1 wherein flaps on both sides of said core extend outwardly beyond the periphery thereof.

3. The subassembly for an encapsulated inductor of claim 2 wherein said flaps extend outwardly beyond the periphery of the core along three edges thereof.

References Cited

UNITED STATES PATENTS

| | | | |
|---|---|---|---|
| 2,229,431 | 1/1941 | Joost | 336—198 X |
| 2,339,054 | 1/1944 | Craddock et al. | 336—192 |
| 2,428,826 | 10/1947 | Baver | 336—208 X |
| 2,899,655 | 8/1959 | Forte et al. | 336—198 |
| 2,916,713 | 12/1959 | Johnston | 336—96 |
| 3,011,140 | 11/1961 | Mittermaier et al. | 336—198 |
| 3,131,371 | 4/1964 | Brekke et al. | 336—198 X |
| 3,162,830 | 12/1964 | Zack et al. | 336—208 |
| 3,189,707 | 6/1965 | Norden et al. | 336—198 X |

FOREIGN PATENTS 731,536  2/1943  Germany.

LEWIS H. MYERS, *Primary Examiner.*

T. J. KOZMA, *Assistant Examiner.*